United States Patent
Sadamitsu

(10) Patent No.: US 10,605,157 B2
(45) Date of Patent: Mar. 31, 2020

(54) WASTEGATE VALVE FOR TURBOCHARGER

(71) Applicant: TOYOTA JIDOSHA KABUSHIKI KAISHA, Toyota-shi, Aichi-ken (JP)

(72) Inventor: Takahiro Sadamitsu, Miyoshi (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 15/919,786

(22) Filed: Mar. 13, 2018

(65) Prior Publication Data
US 2018/0266310 A1   Sep. 20, 2018

(30) Foreign Application Priority Data
Mar. 16, 2017 (JP) ................................. 2017-051179

(51) Int. Cl.
*F02B 37/18* (2006.01)
*F16K 1/20* (2006.01)
*F01D 17/10* (2006.01)

(52) U.S. Cl.
CPC .......... *F02B 37/186* (2013.01); *F01D 17/105* (2013.01); *F16K 1/20* (2013.01); *F05D 2220/40* (2013.01); *Y02T 10/144* (2013.01)

(58) Field of Classification Search
CPC ...... F02B 37/186; F02M 26/67; F02M 26/53; F02M 26/18; Y02T 10/144
See application file for complete search history.

(56) References Cited

U.S. PATENT DOCUMENTS

| | | | |
|---|---|---|---|
| 9,127,590 B2 | 9/2015 | Schoenherr et al. | |
| 2012/0292547 A1* | 11/2012 | Kierat | F02B 37/18 251/231 |
| 2012/0317975 A1* | 12/2012 | Schoenherr | F02B 37/183 60/602 |
| 2014/0345273 A1* | 11/2014 | Yamaguchi | F02B 37/183 60/602 |
| 2016/0178028 A1* | 6/2016 | Lummer | F02B 37/186 251/321 |

(Continued)

FOREIGN PATENT DOCUMENTS

| | | | | |
|---|---|---|---|---|
| DE | 10 2012 101 322 A1 | 12/2012 | | |
| DE | 102011088034 A1 * | 6/2013 | ............ | F02B 37/186 |

(Continued)

OTHER PUBLICATIONS

DE-102012216893, Machine Translation, Translated on Jul. 12, 2019.*

*Primary Examiner* — Patrick D Maines
(74) *Attorney, Agent, or Firm* — Oliff PLC

(57) ABSTRACT

A wastegate valve includes a swing arm, a valve body including a valve stem inserted through an insertion hole of the swing arm and a valve plate configured to close a wastegate port, a support plate being fixed to an end of the valve stem on a side opposite to the valve plate, and an elastic member biasing the valve plate in a extending direction of the valve stem. The elastic member includes a plurality of first lug portions and a plurality of second lug portions projecting from an outer peripheral edge of a connecting portion of the elastic member. The first lug portions and the second lug portions curve toward different sides in the extending direction of the valve stem.

3 Claims, 5 Drawing Sheets

(56) References Cited

U.S. PATENT DOCUMENTS

2017/0248071 A1\* 8/2017 Diemer ................ F02B 37/186
2018/0094573 A1\* 4/2018 Schoenherr ........... F01D 11/003

FOREIGN PATENT DOCUMENTS

DE     10 2012 216 893 A1    4/2014
DE       102012216893 A1 \*   4/2014        ............ F02B 37/183
JP            5995989 B2    9/2016

\* cited by examiner

WASTEGATE VALVE FOR TURBOCHARGER

INCORPORATION BY REFERENCE

The disclosure of Japanese Patent Application No. 2017-051179 filed on Mar. 16, 2017 including the specification, drawings and abstract is incorporated herein by reference in its entirety.

BACKGROUND

1. Technical Field

The present disclosure relates to a wastegate valve for a turbocharger.

2. Description of Related Art

A turbocharger described in U.S. Pat. No. 9,127,590 includes a wastegate port provided in a turbine housing, and a wastegate valve configured to open and close the wastegate port. The wastegate valve includes a swing arm including a shaft rotatably supported by the turbine housing and a lever fixed to a head of the shaft. A valve body configured to close the wastegate port is tiltably attached to the lever. The valve body includes a valve stem passed through an insertion hole provided in the lever, and a valve plate provided on a head side of the valve stem. The valve plate closes the wastegate port such that a surface of the valve plate on the opposite side from the lever abuts with the turbine housing. An end of the valve stem on the opposite side from the valve plate side projects from the insertion hole, and a support plate is fixed to the end.

Further, in the wastegate valve of U.S. Pat. No. 9,127,590, an elastic member is sandwiched between the lever and the support plate. The elastic member includes an annular connecting portion through which the valve stem of the valve body is passed, and a plurality of lug portions projecting radially outward from an outer peripheral edge of the connecting portion. One surface of the connecting portion makes surface contact with the support plate. The lug portions curve toward the lever side in an extending direction of the valve stem, and their heads abut with the lever. The elastic member biases the valve body in an axial direction of the valve stem via the support plate. This restrains the valve body from wobbling with respect to the lever.

SUMMARY

In the wastegate valve of U.S. Pat. No. 9,127,590, when a large force acts on the valve plate in the valve body, the lug portions of the elastic member greatly elastically deform accordingly. In a case where the deformation amounts of the lug portions of the elastic member are excessively large, a state where the lug portions cannot completely return to their original states, that is, so-called fatigue is easily caused. Particularly, in a case where the elastic member is under a high temperature environment, the deformation amounts of the lug portions easily increase, so that the fatigue is easily caused. In a case where the lug portions are weakened, it might become difficult to appropriately restrain the wobbling between the lever and the support plate or between the lever and the valve plate by the elastic member.

An aspect of the disclosure is related to a wastegate valve for a turbocharger. The wastegate valve includes a swing arm being rotatably supported by a turbine housing of the turbocharger and having an insertion hole, a valve body including a valve stem which is inserted through the insertion hole and a valve plate which is provided in an end of the valve stem and is configured to close a wastegate port by abutting with the turbine housing, a support plate being fixed to a part of the valve stem which projects from the insertion hole and is on an opposite side of the valve stem with respect to the valve plate, and an elastic member which includes an annular connecting portion where the valve stem is inserted and a plurality of lug portions that project radially outwardly from an outer peripheral edge of the connecting portion and curve toward an extending direction of the valve stem. The valve body is tiltably fixed to the swing arm. The elastic member is sandwiched at least between the support plate and the swing arm or between the swing arm and the valve plate. The elastic member biases the valve body in the extending direction of the valve stem. The lug portions include a plurality of first lug portions curving toward a first side in the extending direction of the valve stem, and a plurality of second lug portions curving toward a second side in the extending direction of the valve stem.

In the above aspect, the first lug portions and the second lug portions in the elastic member elastically deform so as to bias the valve body in the extending direction of the valve stem. On that account, the elastic deformation amount of the elastic member in the extending direction of the valve stem is dispersed between the first lug portions and the second lug portions. Hereby, the elastic deformation amount per lug portion becomes small in comparison with an elastic member in which a plurality of lug portions all curves toward a first side in the extending direction of the valve stem, for example. Accordingly, even in a case where the elastic member is under a high temperature environment, the elastic deformation amounts of the lug portions do not increase excessively, thereby making it possible to restrain fatigue of the lug portions of the elastic member. As a result, it is possible to appropriately restrain wobbling caused due to the fatigue of the lug portions.

The swing arm may include a shaft and a lever. The swing arm may be rotatably supported by the turbine housing via the shaft. The insertion hole may be formed in the lever. The valve body may be tiltably fixed to the lever.

A total number of the first lug portions may be equal to a total number of the second lug portions. The first lug portions may be disposed in an opposed manner across a central axis of the connecting portion. The second lug portions may be disposed in the opposed manner across the central axis of the connecting portion.

In the above aspect, the total number of first lug portions and the total number of second lug portions are the same, and therefore, it is possible to restrain either ones of the first lug portions and the second lug portions from having an excessively large elastic deformation amount as compared with the other ones. Further, if the first lug portions are placed on a first side and the second lug portions are placed on a second side with the central axis of the connecting portion being sandwiched therebetween, the biasing force of the elastic member to the valve body easily works as a force in a direction inclined to the central axis of the connecting portion. When such a biasing force acts on the valve body, the adhesion property of the valve plate in the valve body with respect to the turbine housing might decrease and the wastegate valve might not enter a complete valve closed state. In this regard, in the configuration, the lug portions curving toward the same side are disposed in an opposed manner across the central axis of the valve stem. Accordingly, the biasing force of the elastic member to the valve body can easily work as a force parallel to the central axis of the connecting portion. This consequently makes it possible to restrain such a situation that the wastegate valve does not enter the complete valve closed state.

The first lug portions and the second lug portions may be provided alternately at regular angles in a circumferential direction around the central axis of the connecting portion.

In the above aspect, the biasing force to the valve plate provided by the elastic member can be equalized in the circumferential direction around the central axis of the connecting portion. Hereby, it is possible to restrain such a situation that a large force acts on some lug portions among the first lug portions and the second lug portions so that the elastic deformation amounts of those lug portions increase excessively. Further, since the biasing force can be exerted at any position in the circumferential direction around the central axis of the connecting portion, it is possible to restrain the wobbling of the valve body to the lever over the circumferential direction of the connecting portion.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
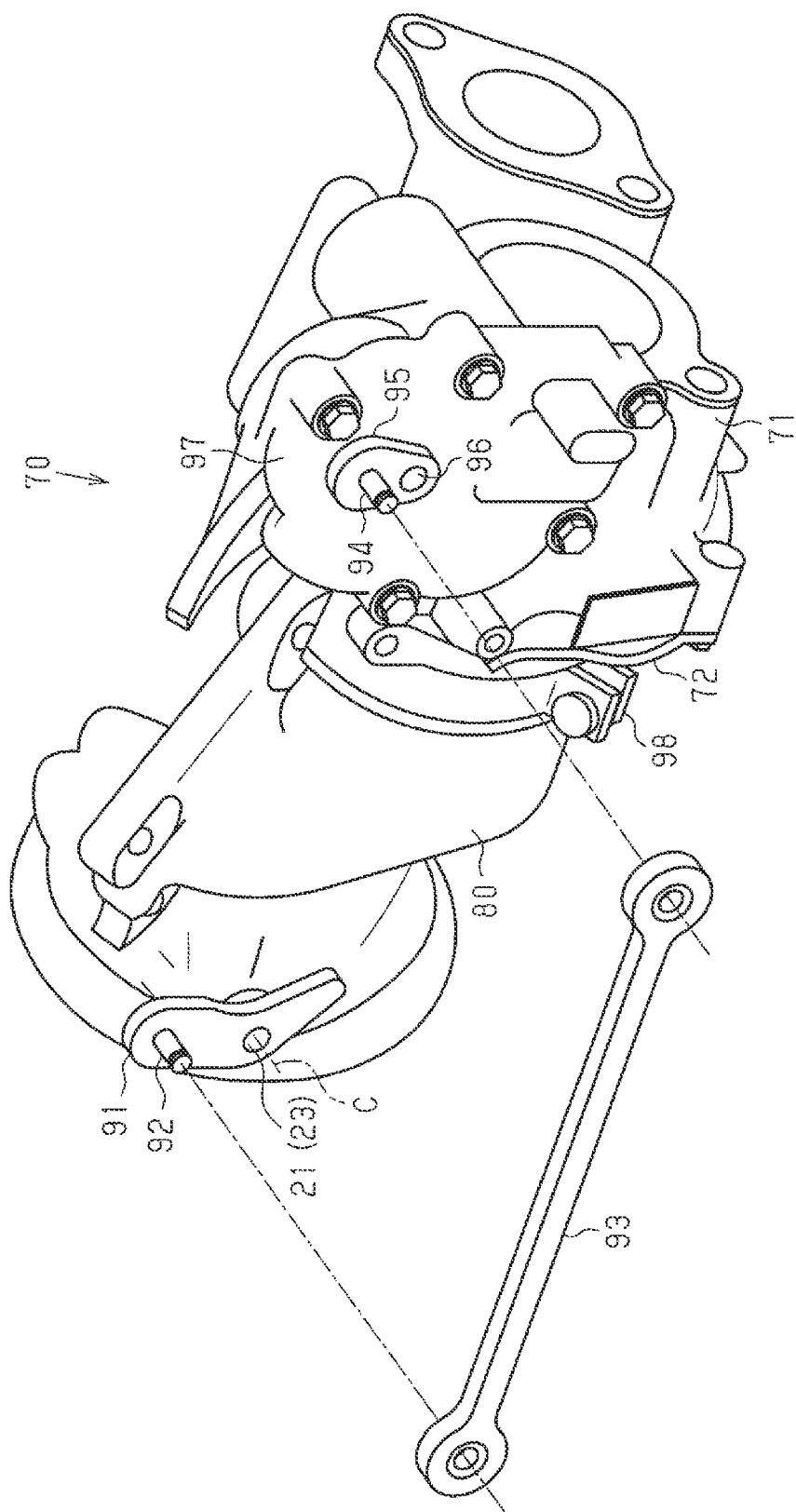
FIG. 1 is a perspective view of a turbocharger.

Embodiments of the present disclosure will be described with reference to FIGS. 1 to 6. The effect of the present disclosure will be described with reference to FIG. 7 and the modified examples of the present disclosure will be described with reference to FIGS. 8 and 9. As illustrated in FIG. 1, a turbocharger 70 includes a compressor housing 71, a bearing housing 72, and a turbine housing 80. The bearing housing 72 is fastened to the compressor housing 71 with bolts (not shown). The turbine housing 80 is assembled to the bearing housing 72 with a clamp 98.

Figure 2:
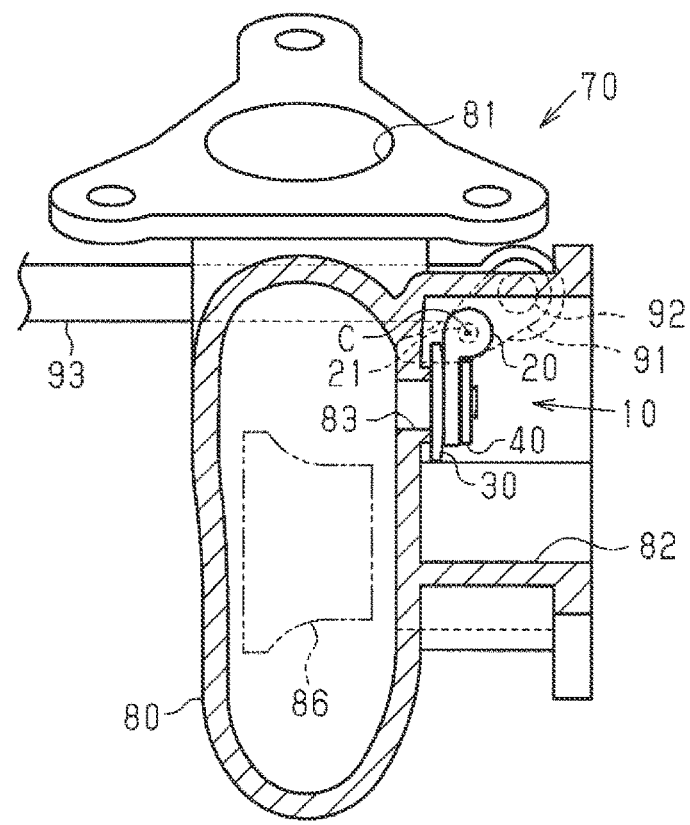
FIG. 2 is a partial sectional view of the turbine housing.

As illustrated in FIG. 2, a turbine wheel 86 is accommodated in the turbine housing 80. The turbine wheel 86 is connected to a compressor wheel accommodated in the compressor housing 71, via a connecting shaft accommodated in the bearing housing 72.

A scroll passage 81 extending so as to surround the turbine wheel 86 is formed in the turbine housing 80. Exhaust gas blown to the turbine wheel 86 through the scroll passage 81 is exhausted from the turbine housing 80 to an exhaust passage through a discharge passage 82. Note that, in the turbocharger 70, the turbine wheel 86 is rotated such that the exhaust gas passing through the scroll passage 81 is blown to the turbine wheel 86. When the turbine wheel 86 is rotated, a compressor wheel is rotated via a connecting shaft, so that pressure charging of intake air is performed.

As illustrated in FIG. 2, a wastegate port 83 is provided in the turbine housing 80. The upstream side from the turbine wheel 86 in the scroll passage 81 communicates with the discharge passage 82 via the wastegate port 83. Hereby, the exhaust gas can flow from the scroll passage 81 to the discharge passage 82 by detouring around the turbine wheel 86.

As illustrated in FIG. 2, the turbocharger 70 includes a wastegate valve 10 configured to open and close the wastegate port 83. The wastegate valve 10 is placed inside the discharge passage 82 in the turbine housing 80. The wastegate valve 10 includes a swing arm 20 rotatably supported by the turbine housing, a valve body 30 attached to the swing arm 20, and a support plate 40 attached to an end of the valve body 30.

Figure 3:
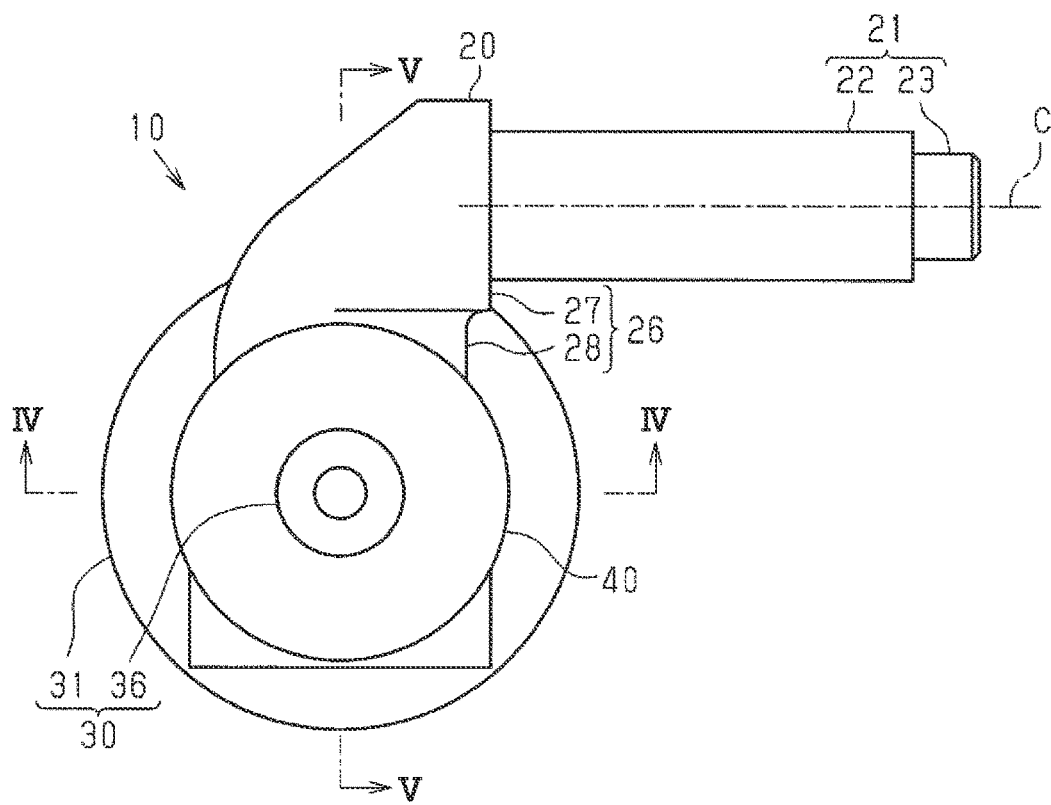
FIG. 3 is a top view of a wastegate valve.

As illustrated in FIG. 3, the swing arm 20 includes a shaft 21 rotatably supported by the turbine housing 80. The shaft 21 includes a small-diameter portion 23 having a circular column shape. The small-diameter portion 23 penetrates through a wall of the turbine housing 80, and partially projects outwardly from an external surface of the turbine housing 80 (the discharge passage 82). A large-diameter portion 22 having a circular column shape extends toward the inside of the turbine housing 80 from one end of the small-diameter portion 23. The large-diameter portion 22 has an outside diameter larger than the small-diameter portion 23. The central axis of the large-diameter portion 22 is coaxial with the central axis C of the small-diameter portion 23.

The swing arm 20 includes a lever 26 extending from an end of the large-diameter portion 22 on the opposite side from the small-diameter portion 23. The lever 26 includes a curved part 27 curving at a right angle to the central axis C of the shaft 21. A generally square plate-shaped fixed portion 28 extends from an edge of the curved part 27. The fixed portion 28 extends in a direction perpendicular to the central axis C of the shaft 21, which is the up-down direction in FIG. 3.

Figure 5:
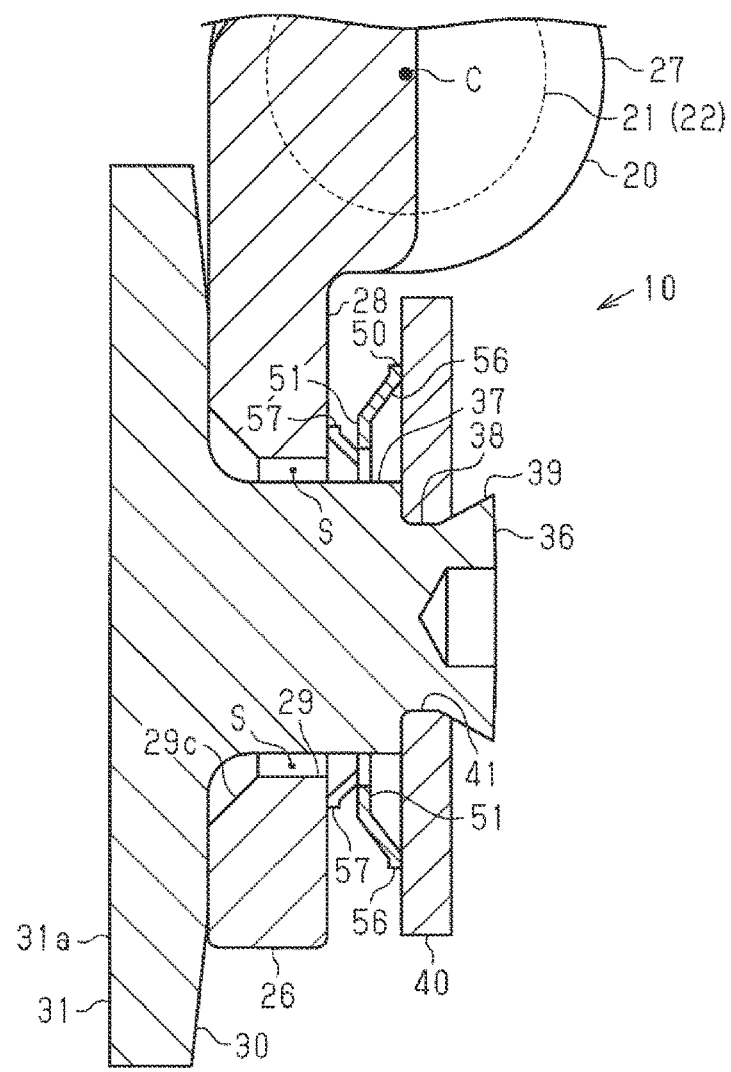
FIG. 5 is a sectional view taken along a line V-V in FIG. 3.
Figure 6:
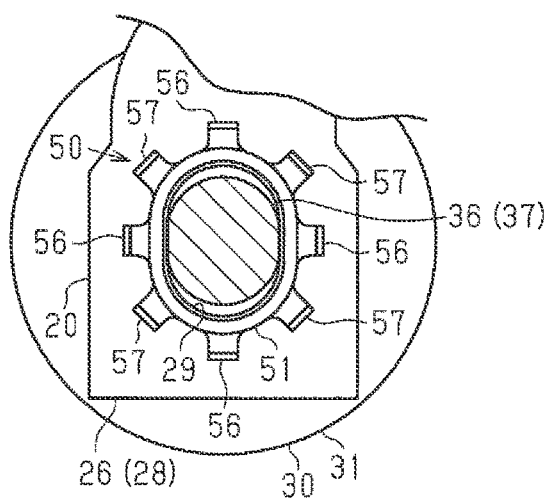
FIG. 6 is a sectional view taken along a line VI-VI in FIG. 4.

As illustrated in FIG. 6, an insertion hole 29 penetrates through generally the center of the fixed portion 28 in the thickness direction of the fixed portion 28. The insertion hole 29 has a generally elliptical shape slightly long in a direction perpendicular to the central axis C of the shaft 21 along the surface direction of the fixed portion 28, which is the up-down direction in FIG. 6. As illustrated in FIG. 5, a part of the insertion hole 29 on a first side (on the side closer to a valve plate 31 described later) in the thickness direction of the fixed portion 28 has a tapered surface 29c that is chamfered so that the inside diameter of the insertion hole 29 increases toward the first side in the thickness direction.

Figure 4:
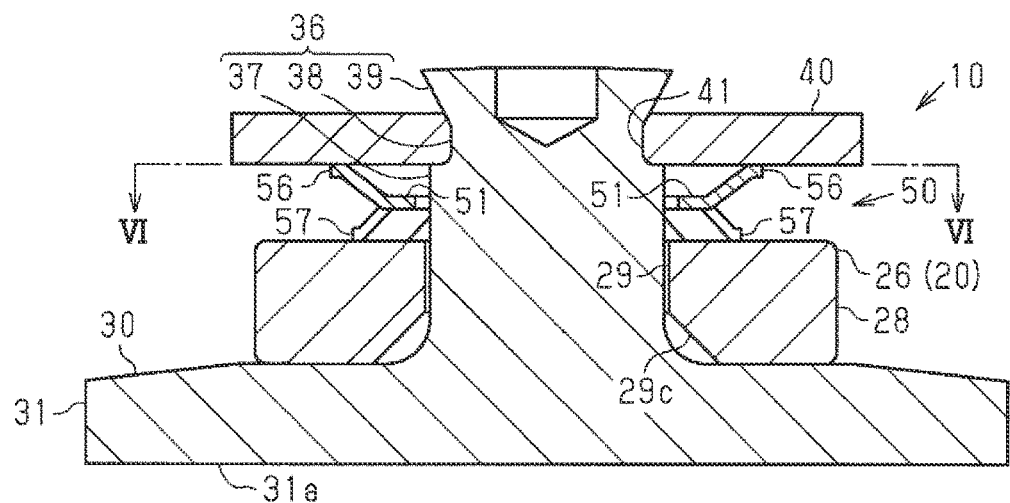
FIG. 4 is a sectional view taken along a line IV-IV in FIG. 3.

As illustrated in FIG. 4, the valve body 30 includes a valve stem 36 passed through the insertion hole 29 of the lever 26 (the fixed portion 28) in the swing arm 20. More specifically, the valve stem 36 includes a large-diameter portion 37 having a generally circular column shape, and the large-diameter portion 37 is passed through the insertion hole 29 of the fixed portion 28 in the lever 26. As illustrated in FIG. 6, the large-diameter portion 37 has a slightly flat elliptical shape in a sectional view perpendicular to the axis direction of the large-diameter portion 37. The short diameter (the dimension in the right-left direction in FIG. 4) of the large-diameter portion 37 is slightly smaller than the short diameter of the insertion hole 29 in the lever 26. As illustrated in FIG. 5, the long diameter (the dimension in the up-down direction in FIG. 5) of the large-diameter portion 37 is properly smaller than the long diameter of the insertion hole 29 in the lever 26. Accordingly, a gap S is secured between an external surface of the large-diameter portion 37 and an edge of the insertion hole 29 in its long-diameter direction.

As illustrated in FIG. 4, a first end (the upper end in FIG. 4) of the large-diameter portion 37 projects from the insertion hole 29 of the fixed portion 28 in the lever 26. The small-diameter portion 38 having a circular column shape extends from a first end surface of the large-diameter portion 37. The outside diameter of the small-diameter portion 38 is smaller than the outside diameter of the large-diameter portion 37. A diameter-increased portion 39 having a generally tapered shape extends from a distal surface of the small-diameter portion 38. An end of the diameter-increased portion 39 on the small-diameter portion 38 side has the same outside diameter as the outside diameter of the small-diameter portion 38. The outside diameter of the diameter-increased portion 39 increases as it is distanced from the small-diameter portion 38.

As illustrated in FIG. 4, the valve body 30 includes the valve plate 31 connected to a second end surface (the lower end surface in FIG. 4) of the large-diameter portion 37 in the valve stem 36 and configured to close the wastegate port 83 by abutting with the turbine housing 80. The valve plate 31 has a generally disk shape and is coaxial with the valve stem 36. The outside diameter of the valve plate 31 is larger than the inside diameter of the insertion hole 29 in the lever 26 and larger than the inside diameter of the wastegate port 83. When an abutting surface 31a which is a surface of the valve plate 31 on the opposite side from the valve stem 36 abuts with the turbine housing 80 so as to cover the wastegate port 83, the wastegate port 83 is closed, that is, the wastegate valve 10 is in a valve closed state. In the meantime, when the abutting surface 31a of the valve plate 31 is distanced from the wastegate port 83 without abutting with the turbine housing 80, the wastegate port 83 is opened, that is, the wastegate valve 10 is in a valve open state.

The support plate 40 having a disc shape is fixed to the small-diameter portion 38 and the diameter-increased portion 39 on the opposite side of the valve stem 36 from the valve plate 31. The outside diameter of the support plate 40 is larger than the inside diameter of the insertion hole 29 in the lever 26. A fixing hole 41 penetrates through the center of the support plate 40 in the thickness direction of the support plate 40. The inside diameter of the fixing hole 41 is generally the same as the outside diameter of the small-diameter portion 38 in the valve stem 36. Note that the support plate 40 is fixed to the valve stem 36 such that the small-diameter portion 38 and the diameter-increased portion 39 of the valve stem 36 are passed through the fixing hole 41 and the diameter-increased portion 39 is then swaged. Thus, the fixed portion 28 of the lever 26 is sandwiched between the support plate 40 and the valve plate 31 of the valve body 30.

The valve body 30 is tiltably fixed to the lever 26. More specifically, as illustrated in FIG. 5, the gap S is secured between the edge of the insertion hole 29 and the external surface of the large-diameter portion 37 in the valve stem 36 on either side in the long-diameter direction. Accordingly, the central axis of the valve stem 36 is tiltable to the central axis of the insertion hole 29 in the lever 26 so as to be inclined in the long-diameter direction (the up-down direction in FIG. 5) of the insertion hole 29. Note that any gap is hardly formed between the edge of the insertion hole 29 and the external surface of the large-diameter portion 37 in the valve stem 36 on either side in the short-diameter direction. Accordingly, the central axis of the valve stem 36 hardly tilts with respect to the central axis of the insertion hole 29 in the lever 26 so as to be inclined in the short-diameter direction of the insertion hole 29.

As illustrated in FIG. 4, an elastic member 50 is sandwiched between the support plate 40 and the fixed portion 28 of the lever 26. The elastic member 50 is configured to bias the valve body 30 to the opposite side (the upper side in FIG. 4) with respect to the valve plate 31 in the extending direction of the valve stem 36 via the support plate 40. As illustrated in FIG. 6, the elastic member 50 includes an annular connecting portion 51 through which the large-diameter portion 37 of the valve stem 36 is passed through. The connecting portion 51 has a generally elliptical annular shape. The long diameter of the inside diameter of the connecting portion 51 is slightly larger than the long diameter of the insertion hole 29 of the lever 26. Further, the short diameter of the inside diameter of the connecting portion 51 is slightly larger than the short diameter of the insertion hole 29 of the lever 26. The elastic member 50 is placed so that the longitudinal direction of the connecting portion 51 is along the longitudinal direction of the insertion hole 29.

As illustrated in FIG. 6, a plurality of first lug portions 56 and a plurality of second lug portions 57 project outward in the radial direction of the connecting portion 51 from an outer peripheral edge of the connecting portion 51. The first lug portions 56 have a generally square plate shape. As illustrated in FIG. 4, the first lug portions 56 curve toward the support plate 40 side (the upper side in FIG. 4) in the extending direction of the valve stem 36. Distal end sides of the first lug portions 56, projecting from the connecting portion 51, curve more toward the support plate 40 side. The first lug portions 56 are elastically deformable in the extending direction (the up-down direction in FIG. 4) of the valve stem 36 with base ends of the first lug portions 56 serving as fulcrums. Note that, in a state where the elastic member 50 is sandwiched between the support plate 40 and the fixed portion 28 of the lever 26, the first lug portions 56 elastically deform toward the valve plate 31 side (the lower side in FIG. 4) in the extending direction of the valve stem 36. As such, the first lug portions 56 are about to elastically return to the support plate 40 side (the upper side in FIG. 4) in the extending direction of the valve stem 36, so as to bias the valve body 30 via the support plate 40.

As illustrated in FIG. 6, the second lug portions 57 have a generally square plate shape. As illustrated in FIG. 4, the second lug portions 57 curve toward the fixed portion 28 of the lever 26 (the lower side in FIG. 4) in the extending direction of the valve stem 36. Distal end sides of the second lug portions 57, projecting from the connecting portion 51, curve more toward the fixed portion 28 side. The second lug portions 57 are elastically deformable in the extending direction (the up-down direction in FIG. 4) of the valve stem 36 with base ends of the second lug portions 57 serving as fulcrums. Note that, in a state where the elastic member 50 is sandwiched between the support plate 40 and the fixed portion 28 of the lever 26, the second lug portions 57 elastically deform toward the support plate 40 side (the upper side in FIG. 4) in the extending direction of the valve stem 36. Since the second lug portions 57 are about to elastically return toward the fixed portion 28 side (the lower side in FIG. 4) in the extending direction of the valve stem 36, the second lug portions 57 bias the connecting portion 51 and the first lug portions 56 toward the support plate 40 side and bias the valve body 30 via the support plate 40.

Note that the first lug portions 56 and the second lug portions 57 have different curving directions from the connecting portion 51, but other shapes of the first lug portions 56 and the second lug portions 57 are generally the same. More specifically, the first lug portions 56 and the second lug portions 57 project outwardly in the radial direction of the connecting portion 51 with generally the same projection amount. Further, the first lug portions 56 and the second lug portions 57 have generally the same curving amount from the connecting portion 51.

As illustrated in FIG. 6, four first lug portions 56 and four second lug portions 57 are provided (eight lug portions in total are provided). The first lug portions 56 and the second lug portions 57 are provided alternately at every 45° in the circumferential direction around the central axis of the connecting portion 51. Accordingly, in the present embodiment, the first lug portions 56 are disposed in an opposed manner across the central axis of the connecting portion 51, and thus, two pairs of first lug portions 56 disposed in an opposed manner are provided. Further, the second lug portions 57 are disposed in an opposed manner across the central axis of the connecting portion 51, and thus, two pairs of second lug portions 57 disposed in an opposed manner are provided. Further, the positions of two of the first lug portions 56 in the circumferential direction around the central axis of the connecting portion 51 are set so that the two of the first lug portions 56 project along the long-diameter direction (the up-down direction in FIG. 6) of the connecting portion 51.

The selection of the material and the design of the elastic member 50 are made so that the elastic member 50 permits the tilting of the valve body 30 in the valve closed state and restrains vibration of the valve body 30 by the exhaust gas hitting the valve plate 31 at the time when the wastegate valve 10 is closed.

As illustrated in FIG. 1, a plate-shaped first link arm 91 is fixed to the shaft 21 (the small-diameter portion 23) of the wastegate valve 10, outside the turbine housing 80. A columnar first connecting pin 92 is fixed to the first link arm 91 at a position distanced from the shaft 21. A first end of a drive rod 93 having a bar shape as a whole is connected to the first connecting pin 92. A columnar second connecting pin 94 is connected to a second end of the drive rod 93. The second connecting pin 94 is fixed to a plate-shaped second link arm 95. A columnar rotating shaft 96 is fixed to the second link arm 95 at a position distanced from the second connecting pin 94. The rotating shaft 96 penetrates through the compressor housing 71 and extends inside the compressor housing. The rotating shaft 96 is connected to an electric motor 97 fixed to the inside of the compressor housing 71.

At the time when the wastegate valve 10 is opened or closed, the electric motor 97 is controlled to be driven by a control device. When the electric motor 97 is driven, the rotating shaft 96 is driven, so that the second link arm 95 is driven mainly around the rotating shaft 96. As a result, the drive rod 93 is driven via the second connecting pin 94, and the first link arm 91 is driven via the first connecting pin 92. Hereby, the shaft 21 (the small-diameter portion 23) of the wastegate valve 10, which is fixed to the first link arm 91, is driven. As a result, the wastegate valve 10 is rotated around the central axis C of the shaft 21 as a rotation center, so that the wastegate valve 10 enters the valve open state or the valve closed state.

At the time when the wastegate valve 10 is closed, the valve plate 31 of the valve body 30 abuts with a wall surface of the turbine housing 80, so that the valve body 30 is inclined to the lever 26 accordingly. Then, the abutting surface 31a of the valve plate 31 in the valve body 30 makes close contact with the wall surface of the turbine housing 80, so that the wastegate valve 10 closes the wastegate port 83.

Next will be described effects of the elastic member 50 in the wastegate valve 10. As illustrated in FIG. 4, the elastic member 50 elastically deforms so as to contract in the extending direction of the valve stem 36, between the fixed portion 28 of the lever 26 and the support plate 40. Here, assume a case where the elastic member 50 includes only either ones of the first lug portions 56 and the second lug portions 57, e.g., the elastic member 50 includes only the first lug portions 56. In this case, most of the elastic deformation amount of the elastic member 50 in the extending direction of the valve stem 36 is covered by elastic deformation of the first lug portions 56. Accordingly, in a case where the elastic member 50 includes only the first lug portions 56 and the elastic deformation amount of the elastic member 50 in the extending direction of the valve stem 36 is large, the elastic deformation amounts of the first lug portions 56 in the extending direction of the valve stem 36 are large, so that a state where the first lug portions 56 cannot completely return to their original states, that is, so-called fatigue easily occurs. Particularly, when the elastic member 50 is under a high temperature environment, the deformation amounts of the first lug portions 56 easily increase, so that the fatigue easily occurs. When the first lug portions 56 are fatigued as such, it might become difficult to appropriately restrain wobbling of the valve body 30 to the lever 26 by the elastic member 50.

Figure 7:
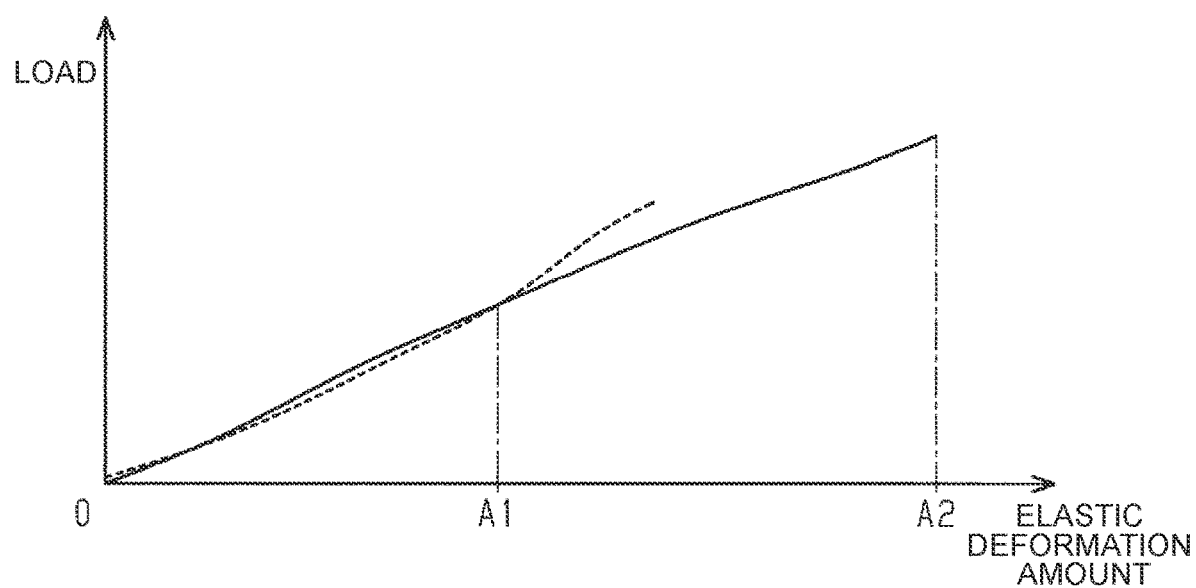
FIG. 7 is a graph illustrating a relationship between a load and an elastic deformation amount in the elastic member.

Further, as indicated by a broken line in FIG. 7, the elastic member 50 including only the first lug portions 56 elastically deforms at a constant ratio according to a load acting on the elastic member 50, until the elastic deformation amount thereof in the extending direction of the valve stem 36 reaches an elastic deformation amount A1. In the elastic member 50 including only the first lug portions 56, when the elastic deformation amount exceeds the elastic deformation amount A1, a load necessary to elastically deform the elastic member 50 increases. That is, the spring constant is uniform up to the elastic deformation amount A1, whereas the spring constant changes after the elastic deformation amount exceeds the elastic deformation amount A1.

For example, when the wastegate valve 10 changes from the valve open state to the valve closed state, a proper load in the extending direction of the valve stem 36 acts on the elastic member 50. At this time, when the elastic deformation amount of the elastic member 50 exceeds the elastic deformation amount A1, the elastic member 50 cannot be deformed with an appropriate elastic deformation amount corresponding to the load. This might result in that the valve body 30 cannot be inclined to the lever 26 appropriately. Accordingly, in the elastic member 50 including only the first lug portions 56, it may be said that a range to the elastic deformation amount A1 in the extending direction of the valve stem 36 is an actually usable range.

In contrast, the elastic member 50 of the present embodiment includes the first lug portions 56 and the second lug portions 57. The first lug portions 56 and the second lug portions 57 curve toward the opposite sides with respect to each other in the extending direction of the valve stem 36. The first lug portions 56 and the second lug portions 57 in the elastic member 50 elastically deform in the extending direction (the up-down direction in FIG. 4) of the valve stem 36. Accordingly, the elastic deformation amount of the elastic member 50 in the extending direction of the valve stem 36 is dispersed between the first lug portions 56 and the second lug portions 57. Hereby, the elastic deformation amount per lug portion is smaller than that in the elastic member 50 including only the first lug portions 56 in the example. Accordingly, even when the elastic member 50 is under a high temperature environment, it is possible to restrain the elastic deformation amounts of the first lug portions 56 and the second lug portions 57 from increasing excessively, thereby making it possible to restrain the first lug portions 56 and the second lug portions 57 from being fatigued. This can hardly cause such a situation that an effect of restraining the wobbling of the valve body 30 with respect to the lever 26 cannot be obtained due to the fatigue of the first lug portions 56 and the second lug portions 57 of the elastic member 50.

Further, as indicated by the continuous line in FIG. 7, in the elastic member 50 of the present embodiment, the elastic deformation amount of the elastic member 50 in the extending direction of the valve stem 36 is dispersed between the first lug portions 56 and the second lug portions 57. From this point, in the elastic member 50 of the present embodiment elastically deforms at a constant ratio according to the load acting on the elastic member 50 until the elastic deformation amount of the elastic member 50 reaches an elastic deformation amount A2 that is larger than the elastic deformation amount A1 in the extending direction of the valve stem 36. That is, in the elastic member 50, a range until the elastic deformation amount A2 in the extending direction of the valve stem 36 is an actually usable range. Accordingly, the actually usable range can be increased in the elastic member 50 of the present embodiment in comparison with the elastic member 50 including only the first lug portions 56.

Further, the first lug portions 56 and the second lug portions 57 have generally the same shape except the curving directions from the connecting portion 51. Further, the total number of first lug portions 56 and the total number of second lug portions 57 are the same. Accordingly, respective elastic deformation amounts of the first lug portions 56 and the second lug portions 57 in the extending direction of the valve stem 36 are generally a half of the elastic deformation amount of the elastic member 50 in the extending direction of the valve stem 36. That is, the elastic deformation amount of the elastic member 50 in the extending direction of the valve stem 36 can be halved between the first lug portions 56 and the second lug portions 57. This makes it possible to restrain either of the elastic deformation amounts of the first lug portions 56 and the second lug portions 57 from increasing.

In the meantime, assume a case where the first lug portions 56 are provided only on a first side of the elastic member 50 and the second lug portions are provided only on a second side thereof with the central axis of the connecting portion 51 being sandwiched therebetween. In this case, the biasing force of the elastic member 50 acts on a first side of the support plate 40 in a biased manner. As a result, the biasing force works on the valve body 30 so that the central axis of the valve stem 36 in the valve body 30 is inclined with respect to the central axis of the insertion hole 29 in the lever 26. When such a force acts on the valve body 30, the adhesion property of the valve plate 31 in the valve body 30 with respect to the turbine housing might decrease and the wastegate valve 10 might not enter a complete valve closed state.

In this regard, in the above embodiment, the first lug portions 56 are disposed opposed to each other across the central axis of the valve stem 36, and the second lug portions 57 are disposed opposed to each other across the central axis of the valve stem 36. Accordingly, the biasing force of the elastic member 50 easily works on the support plate 40 as a force parallel to the central axis of the valve stem 36. This makes it possible to restrain such a situation that the wastegate valve 10 does not enter the complete valve closed state.

Further, the elastic member 50 is configured such that the first lug portions 56 and the second lug portions 57 are provided alternately at every 45° in the circumferential direction around the central axis of the connecting portion 51. Accordingly, a situation in which the first lug portions 56 or the second lug portions 57 are placed in an unbalanced manner in the circumferential direction of the connecting portion 51 does not occur. This makes it possible to equalize the biasing force of the elastic member 50 to the valve body. Hereby, it is possible to restrain such a situation that a large force acts on some lug portions among the first lug portions 56 and the second lug portions 57 so that the elastic deformation amounts of those lug portions increase excessively. Further, since the biasing force can be exerted at any positions in the circumferential direction around the central axis of the connecting portion 51, it is possible to restrain the wobbling of the valve body 30 to the lever 26 over the circumferential direction of the connecting portion 51.

Further, in the above embodiment, the gap S is secured between the edge of the insertion hole 29 and the external surface of the large-diameter portion 37 in the valve stem 36 on either side in the long-diameter direction, so that the central axis of the valve stem 36 is tiltable with respect to the central axis of the insertion hole 29 in the lever 26 so as to be inclined in the long-diameter direction (the up-down direction in FIG. 5) of the insertion hole 29. In order to handle the tilting, two first lug portions 56 among the four first lug portions 56 in the elastic member 50 project along the long-diameter direction (the long-diameter direction of the insertion hole 29) of the connecting portion 51. Accordingly, when the valve body 30 is inclined, either of the two first lug portions 56 surely elastically deforms so as to exert the biasing force.

Figure 8:
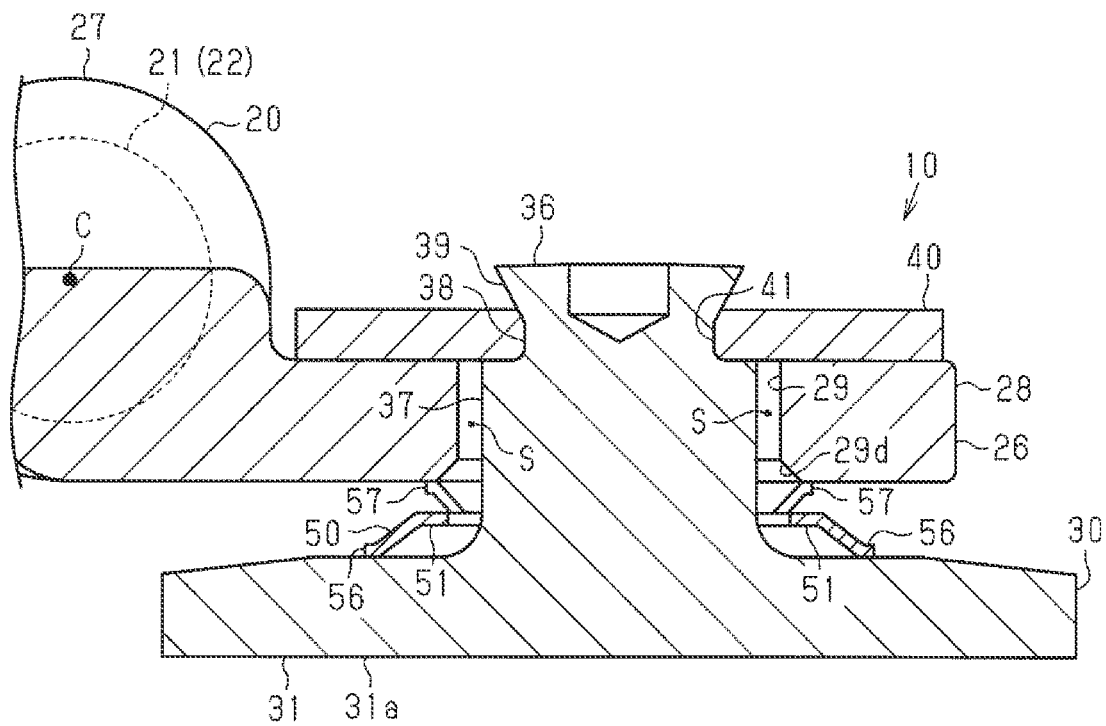
FIG. 8 is a sectional view of a modified example of the wastegate valve.

Note that the embodiment can be modified as follows. In the embodiment, the elastic member 50 is sandwiched between the support plate 40 and the lever 26 (the fixed portion 28), but the elastic member 50 may be sandwiched between the lever 26 (the fixed portion 28) and the valve plate 31 of the valve body 30 as illustrated in FIG. 8. Further, in this case, the shapes of the swing arm 20, the valve body 30, and the support plate 40 may be changed appropriately depending on the position of the elastic member 50. For example, in a case where the size of a chamfer is large like the tapered surface 29c in the insertion hole 29 in the embodiment and the first lug portions 56 or the second lug portions 57 cannot be brought into contact with a proper position of the lever 26 (the fixed portion 28), a tapered surface 29d having a chamfer smaller than that of the tapered surface 29c in the embodiment may be employed as illustrated in FIG. 8.

Further, the elastic member 50 may be sandwiched between the support plate 40 and the lever 26 (the fixed portion 28) and between the lever 26 (the fixed portion 28) and the valve plate 31 of the valve body 30. In the embodiment, the connecting portion 51 of the elastic member 50 has a generally elliptical annular shape, but is not limited to this. For example, the connecting portion 51 may have a complete annular shape, or a polygonal annular shape.

In the embodiment, the total number of first lug portions 56 and the total number of second lug portions 57 are the same, but they may be different from each other. Even in this case, the elastic member 50 should include a plurality of the first lug portions 56 and a plurality of the second lug portions 57.

Figure 9:
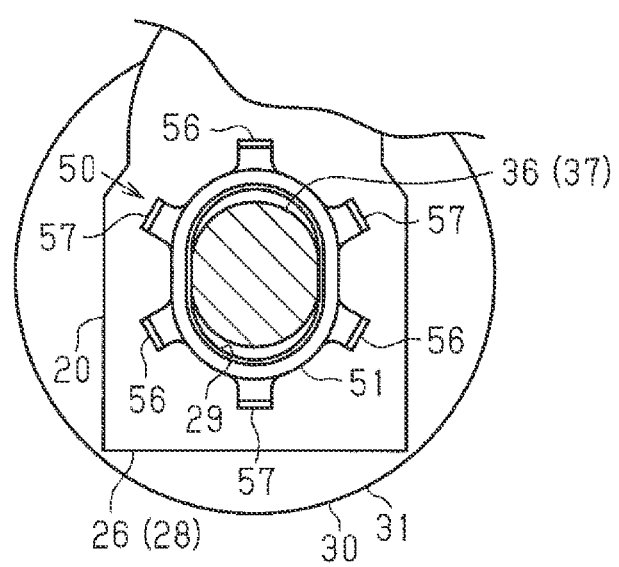
FIG. 9 is a sectional view of a modified example of the wastegate valve.

In the embodiment, the total number of first lug portions 56 and the total number of second lug portions 57 are even, but the total number of first lug portions 56 and the total number of second lug portions 57 may be odd. For example, as illustrated in FIG. 9, the elastic member 50 may include three first lug portions 56 and three second lug portions 57. Note that, even in this case, as illustrated in FIG. 9, the first lug portions 56 and the second lug portions 57 are preferably provided alternately at the same angles (in this example, the regular angle is 60°).

In the embodiment, the first lug portions 56 are disposed in an opposed manner across the central axis of the connecting portion 51, and the second lug portions 57 are disposed in an opposed manner across the central axis of the connecting portion 51, but they are not limited to this. For example, as illustrated in FIG. 9, the first lug portions 56 may be displaced opposed to the second lug portions 57 across the central axis of the connecting portion 51. Further, the lug portion may not necessarily be disposed opposed to another lug portion across the central axis of the connecting portion 51. Even in this case, since the elastic member 50 includes the first lug portions 56 and the second lug portions 57, the elastic member 50 can reduce respective elastic deformation amounts of the first lug portions 56 and the second lug portions 57, in comparison with the elastic member provided with lug portions only on the first side in the extending direction of the valve stem 36.

In the embodiment, the first lug portions 56 and the second lug portions 57 are provided at the same angles in the circumferential direction around the central axis of the connecting portion 51, but the first lug portions 56 and the second lug portions 57 may not be placed at the same angles in the circumferential direction. For example, in the embodiment, the valve body 30 is tiltable relative to the central axis of the insertion hole 29 in the lever 26 so that the central axis of the valve stem 36 is inclined in the long-diameter direction (the up-down direction in FIG. 5) of the insertion hole 29. Accordingly, when the lug portions extending in the long-diameter direction of the insertion hole 29 (the connecting portion 51) are provided, the wobbling of the valve body 30 can be restrained to some extent.

In the embodiment, the first lug portions 56 and the second lug portions 57 are provided alternately in the circumferential direction of the connecting portion 51, but they may not be provided alternately. In the embodiment, the first lug portions 56 and the second lug portions 57 project outwardly in the radial direction of the connecting portion 51 with generally the same projection amount, but they may have different projection amounts. Further, in the embodiment, the first lug portions 56 and the second lug portions 57 have generally the same curving amount from the connecting portion 51, but they may have different curving amounts. The shapes of the first lug portions 56 and the second lug portions 57 can be changed appropriately depending on the shapes of the swing arm 20, the valve body 30, the support plate 40, and the like. Even in this case, if the elastic member 50 includes the first lug portions 56 and the second lug portions 57, it is possible to reduce respective elastic deformation amounts of the first lug portions 56 and the second lug portions 57, in comparison with the elastic member 50 including only either ones of the first lug portions 56 and the second lug portions 57.

What is claimed is:

1. A wastegate valve for a turbocharger, the wastegate valve comprising:
    a swing arm rotatably supported by a turbine housing of the turbocharger, the swing arm having an insertion hole;
    a valve body including a valve stem and a valve plate, the valve stem being inserted through the insertion hole, a portion of the valve stem that is passed through the insertion hole having an elliptical shape in a sectional view perpendicular to an axis direction of the portion, the valve plate being provided in an end of the valve stem, the valve plate being configured to close a wastegate port by abutting with the turbine housing;
    a support plate, the support plate being fixed to a part of the valve stem, the part being projecting from the insertion hole, the part being on an opposite side of the valve stem with respect to the valve plate; and
    an elastic member, the elastic member including an annular connecting portion through which the valve stem is inserted, and a plurality of lug portions, the connecting portion having a substantially elliptical or polygonal annular shape, the lug portions being projecting radially outwardly from an outer peripheral edge of the connecting portion and curving toward an extending direction of the valve stem, wherein:
    the valve body is tiltably fixed to the swing arm;
    the elastic member is sandwiched at least between the support plate and the swing arm or between the swing arm and the valve plate;
    the elastic member biases the valve body in the extending direction of the valve stem; and
    the lug portions include a plurality of first lug portions curving toward a first side in the extending direction of the valve stem, and a plurality of second lug portions curving toward a second side in the extending direction of the valve stem, the plurality of first and the plurality of second lug portions being alternately disposed at every 45 degrees in a circumferential direction around a central axis of the connecting portion.

2. The wastegate valve according to claim 1, wherein:
    the swing arm includes a shaft and a lever;
    the swing arm is rotatably supported by the turbine housing via the shaft;
    the insertion hole is formed in the lever; and
    the valve body is tiltably fixed to the lever.

3. The wastegate valve according to claim 1, wherein both the plurality of first and the plurality of second lug portions elastically deform in the extending direction and project outwardly in the radial direction of the connecting portion.

* * * * *